Figure 1:
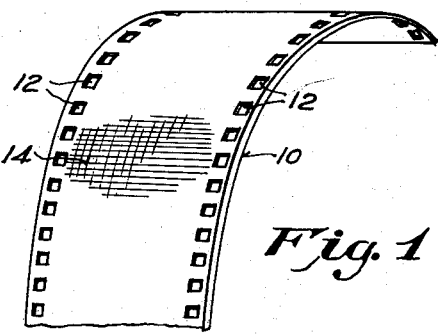

Jan. 8, 1963   F. P. WILLCOX   3,072,889
DENSITOMETRIC DATA HANDLING SYSTEM
Filed April 20, 1955   3 Sheets-Sheet 1

F. P. Willcox
INVENTOR

BY Homer R. Montague
ATTORNEY

Jan. 8, 1963 F. P. WILLCOX 3,072,889
DENSITOMETRIC DATA HANDLING SYSTEM
Filed April 20, 1955 3 Sheets-Sheet 2
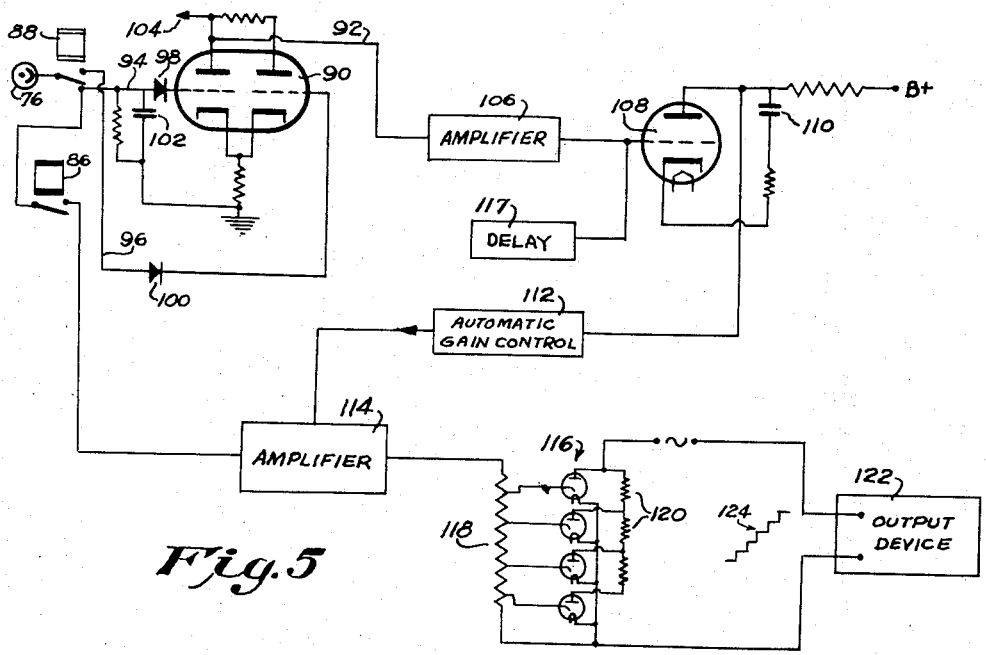
*Fig. 5*
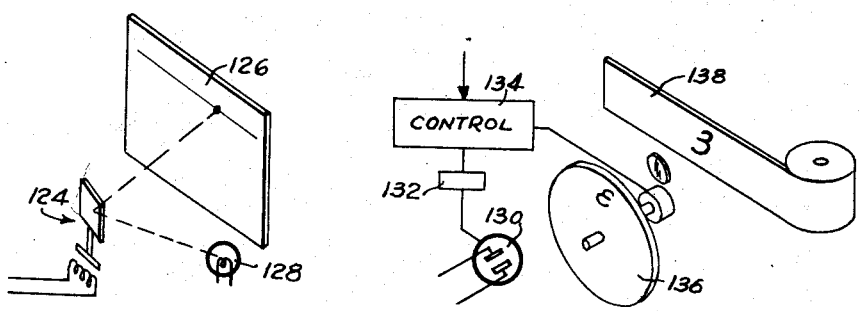
*Fig. 6*     *Fig. 7*
F. P. Willcox,
INVENTOR
BY Homer R. Montague
ATTORNEY Jan. 8, 1963 F. P. WILLCOX 3,072,889
DENSITOMETRIC DATA HANDLING SYSTEM
Filed April 20, 1955 3 Sheets-Sheet 3

F. P. Willcox,
INVENTOR

BY Homer R. Montague
ATTORNEY

United States Patent Office 3,072,889
Patented Jan. 8, 1963

3,072,889
DENSITOMETRIC DATA HANDLING SYSTEM
Frederick P. Willcox, Old Westbury, N.Y., assignor to Fairchild Camera and Instrument Corporation, a corporation of Delaware
Filed Apr. 20, 1955, Ser. No. 502,711
10 Claims. (Cl. 340—173)

This invention pertains to data recording and reproducing systems, and particularly to an improved system for storing facts or information which can be reduced to the form of data, and for reproducing all or any selected part of the information at will.

In the development of modern computing machinery, the problem of data storage has been attacked in various ways. As is well recognized in this field, there are two aspects to this storage problem. First, basic information affecting a problem or field of investigation is required to be stored in accurate and reproducible form for rather long periods of time. Thus, and solely by way of example, accounting systems may require debit and credit information to be maintained for periods of weeks or months. In large installations, the equipment required for such storage becomes exceedingly cumbersome, and great difficulty is experienced in locating and reading out desired individual items when they are required either for record or computational purposes. There is also the second, or short-term storage problem, which is usually concerned with the computational processes which require basic information (or data derived therefrom) to be held pending the completion of other operations which the basic information must control.

The present invention provides a solution which is principally related to the long-term storage problem, and aims to reduce the bulk of the stored data, as well as to facilitate its availability, by utilizing the full potentialities of photographic recording processes.

It is realized that it has often been proposed to reduce information, data and the like to symbolic patterns which are recorded as dark and light areas of photographic media or as holes in punched cards, magnetized areas on suitable strips, and the like. Many of the relative advantages and disadvantages of these "permanent" or long-term storage procedures have been recognized. The present invention is directed to the provision of a photographic or like data storage, handling and readout system and procedure which decreases the bulk factor by one or more orders (factors of 10) while maintaining a high standard of accuracy and efficiency in the interpretation of the information as required.

The invention is especially adapted to the storage and subsequent treatment of information which can be reduced to digital form, but in no way limiting the radix of the digit system which can be employed. In this respect, the invention provides inherent simplification in recording and readout processes, as compared with previous digit systems utilizing on-off or binary recording. This advantage will be better understood by considering that in the case of punched card data manipulation, for example, an elemental area of the card or sheet is capable of recording only one binary digit: either the area is a punched hole or it is not. While such a system permits the ultimate recording of values of any size by utilizing combinations together constituting a representation of a large number of binary digits, it does so only at the expense of requiring large and complicated scanning or reading apparatus for deriving an output determined by the necessary number of binary conditions. Such a system is not conducive to storage of the maximum amount of information in a given volume of recording material, and is wasteful of both time and equipment when selected data are to be withdrawn from the storage material.

Basically, the present invention overcomes this difficulty by storing the information in the form of the optical condition (such as density or transparency) of individual elemental areas of suitable record material, especially photographic material. More specifically, the invention records the information in terms of a difference in optical density of a minute area of such material, which density may have as many as 50 discrete values, depending upon the selected photographic material and its tonal range or "scale."

The advantage of this basic concept is readily realized from the fact that the number of sensing or scanning steps required to read out a given amount of information is divided by the ratio of the number of sensible differences in photographic density to the radix or base of the comparable known data handling arrangements. Thus, if a selected photographic material has a density range yielding 50 discrete sensible steps, approximately 25 times as much information can be stored in a given elemental area of the record as is possible with a punched card or other device of purely binary form. In making this comparison, it should be understood that while the punched card system can be adapted to other than binary recording, e.g., to quinary, decimal, and other systems of different radices, this can only be done by utilizing combinations of several elemental areas, and with consequent complication in the handling apparatus necessary to read several areas simultaneously or in succession.

It is therefore a further object of the invention to provide a data recording and handling system in which an elemental area of record material of extremely small size is utilized to record digital information in a numerical system of large radix.

A further object of the invention is to provide an information storage and handling system in which each item of information is recorded and stored as an optical state or condition of an extremely small area of a photographic or equivalent tonal record. In the present state of the art, considering both tonal range and geometrical resolution of photographic materials, it is contemplated that the elemental area may be of the order of 0.020 inch square, permitting at the limit some 2500 such elements to the square inch of record surface. Such materials readily provide from ten to fifty discrete and sensible density variations, depending upon the nature of the emulsion and the support (whether film or paper, for example), so that a total of 50 times 2500 or 125,000 bits of information can readily be stored per square inch of material. This is to be compared with the presently used punched card or Hollerith system, in which not over about a thousand bits of information (binary digits) can be stored on a card measuring about 20 square inches in area. The space factor is thus about two or three thousand to one.

An important limitation upon the use of photographic techniques for the purpose described is the fact that while a photographic material will maintain an accurate indication of the relative density of different areas thereof, the absolute density may vary with time due to aging of the material and other factors. The present invention has for an ancillary object a system which automatically corrects for such changes or differences, not only as between the same record scanned at different times, but also as between different records which may have been made far apart and with different recording devices. To this end, the invention provides for the standardization of the density readings or values at closely spaced times, so that not only long term variations are corrected for, but so that short term changes in the equipment itself are cancelled out. In referring to "photographic" records, it is not intended to exclude equivalent records, such as printed records, having adequate optical tonal range.

In order to achieve the above objects, and in general to accomplish the aims of the invention, provision has also been made for novel means for preparing the original record of the information which is to be kept in stored form. Such apparatus includes means for converting items of information into variations in the quantum of light delivered to sucessive elemental areas of a photographic or equivalent densitometric record, controllable either from other types of storage equipment or from a manual keyboard or the like. It also includes means for impressing upon the record indicia or representations of the maximum and minimum densities being used, which when later sensed will establish the proper relative output values of the readout instrumentalities and accomplish the correction for changes in absolute density due to aging of the material, variations in the photographic processes, maladjustments of the equipment and so on.

A further object of the invention is to provide a novel form of information and data storage record utiliizng the principal of multiple discrete values as described above and including the self-correcting features just noted.

Figure 2:
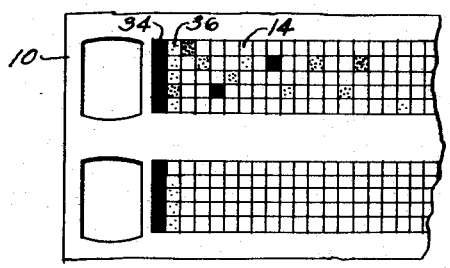
Figure 3:
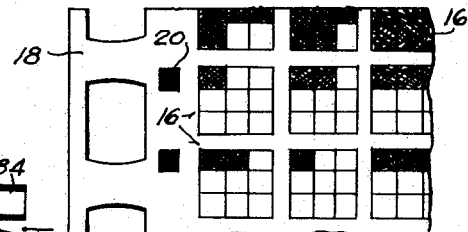
Figure 4:
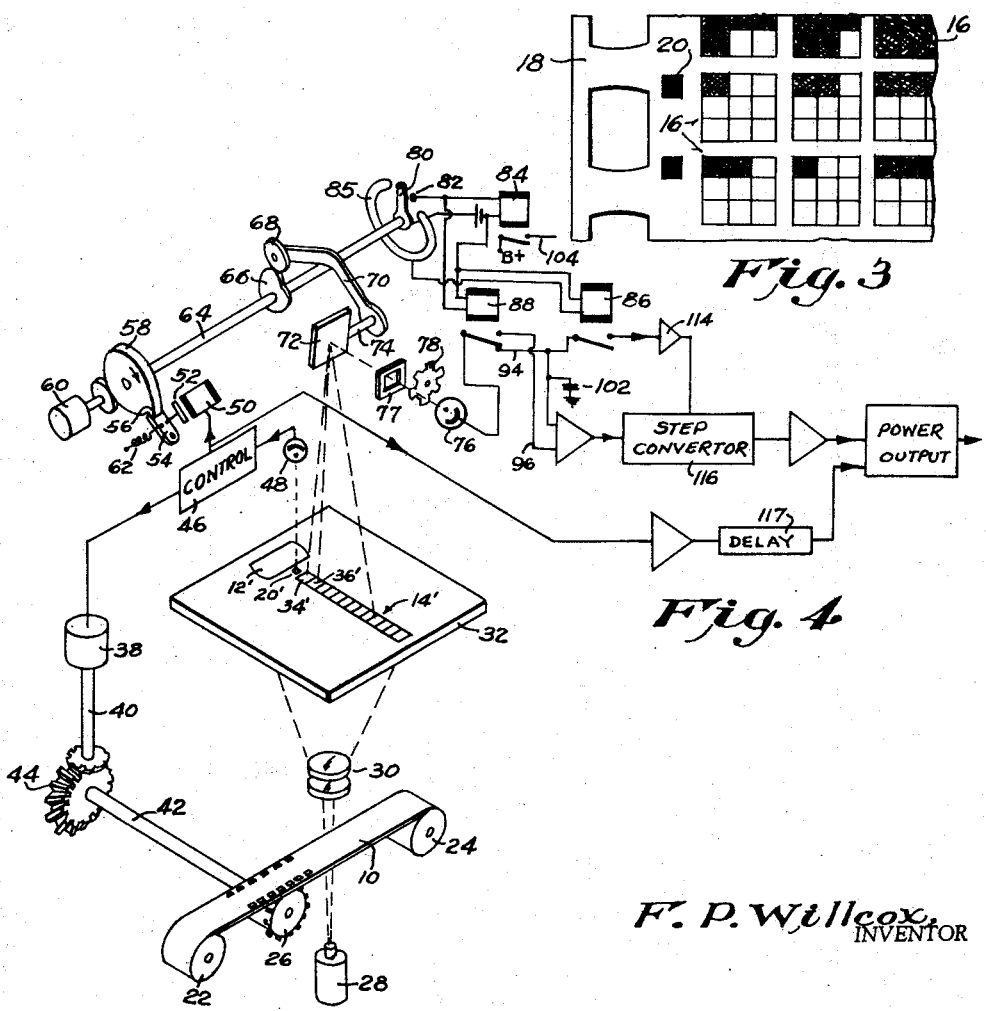
Figure 8:
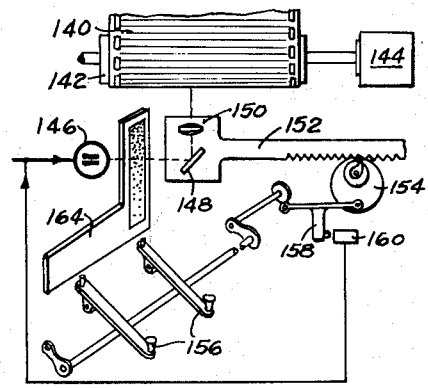
Figure 9:
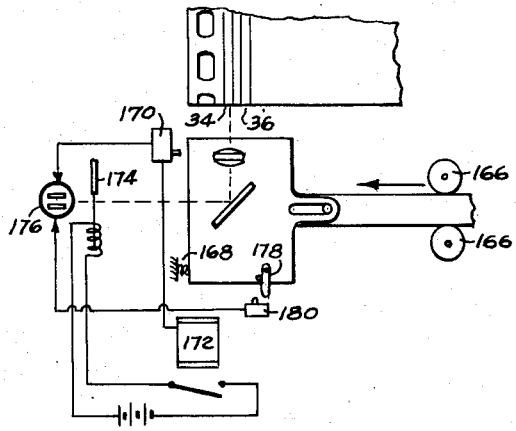
Figure 10:
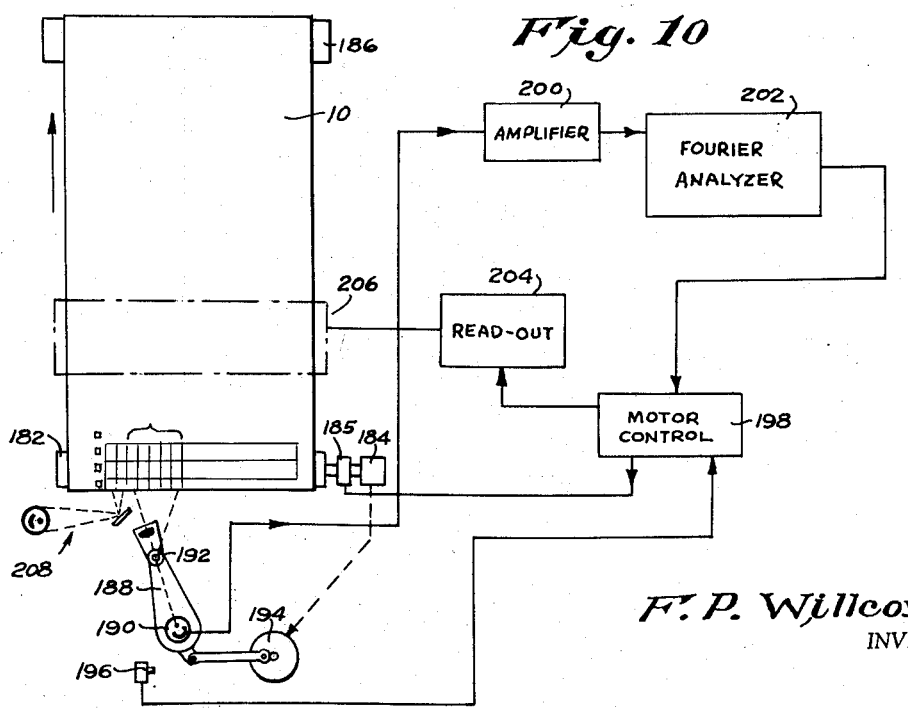

The above and other objects of the invention will best be understood by referring now to the following detailed specification of certain preferred and exemplary embodiments, taken in connection with the appended drawings in which:

FIG. 1 is a fragmentary perspective view of a typical record strip useful with the invention, FIG. 2 is an enlarged plan view of a portion of the record of FIG. 1, FIG. 3 is a similar view of a portion of a modified record, FIG. 4 is a perspective schematic diagram, partly in block form, of portions of a typical form of readout device according to the invention, FIG. 5 is a schematic and block diagram of further parts of the readout equipment of FIG. 4, FIG. 6 is a fragmentary perspective view of one type of output instrumentality which may be driven by the equipment of FIGS. 4 and 5, FIG. 7 is a view similar to FIG. 6 of a modified output device, FIG. 8 is a schematic view of a manually controlled system for initially recording information on a strip such as the strip of FIG. 1, FIG. 9 is a view similar to FIG. 8 but to a larger scale, illustrating a suitable means for automatically recording on the strip the fiducial values of maximum and minimum densities, and FIG. 10 is a flow diagram of a typical arrangement for automatically searching a record strip to lociate desired information which is recorded thereon.

Before proceeding with the detailed description of the illustrated embodiments of the invention, it is desired to indicate that the record material itself may be of various types, in themselves familiar to those skilled in the photographic field. In addition to ordinary films and papers using light sensitive silver halide emulsion coatings, and which ordinarily require intermediate processing steps of a chemical nature for the development of the desired incremental densitiy patterns, printing-out materials may be used where sufficient light intensity for rapid exposures is provided. Diazo and other light sensitive dyes may also be used as the sensitive developable material. A collateral advantage of the use of photographic materials for the large scale storage of data is, of course, the possibility of making duplicate or extract copies of the density recordings themselves, by known printing techniques of the photographic trade. This feature is especially valuable in the case of the invention because of its self-standardizing feature, which makes the data derived from the record accurate regardless of the precision with which the absolute densities are reproduced. By the use of duplicate copies made at little expense, safe-keeping of valuable records is assured under the most adverse conditions, and it is also made feasible to provide duplicate originals for simultaneous processing at different locations or for different analytical purposes.

In the illustrative examples which follow, the use of the invention in connection with fiscal records is presumed, because the invention is especially well adapted to such purposes. However, the invention also provides the possibility of recording and storing elaborate tables of mathematical or other data, values of functions and the like, which have heretofore not been widely available except as printed tables and hence either of limited accuracy (number of significant figures) or of unwieldy dimensions and high cost, as in the case of accurate tables of logarithms, functions and the like. The invention for the first time makes it feasible to provide a desk-size machine capable of giving a direct indication of the logarithm of any number, for example, or the probability integral for any value of the argument, to many places of decimals, merely upon operation of selector keys defining the selected value of the argument and the function.

Referring now to FIG. 1 of the drawings, there is shown a portion of a record strip in accordance with the invention, specifically in the form of a piece of ordinary 35 millimeter film bearing successive lines of recorded density portions or elemental areas. The film is designated by numeral 10, and is provided with the usual sprocket holes 12 if desired, and the lines of unit areas are arranged across the narrow dimension of the strip as at 14. Since areas as small as 20 thousandths of an inch square may easily be "read" by suitable densitometer techniques, such a film may contain 50 or more unit spots between its sprocket holes, and 50 or more lines per running inch of the film. As a matter of fact, individual areas as small as $1/1000$ of an inch square have been sensed experimentally, the limit with respect to the smallest of the unit area being determined by characteristics of the record such as graininess, and by the degree of refinement which is used in the design of the densitometric equipment.

FIG. 2 shows to a larger scale one possible arrangement of data on the film 10, the lines of unit spots being arranged in contiguous groups of 5 such lines merely for indexing purposes, since the lines could equally well adjoin one another throughout the area. Each small square in each line represents one item of information, in terms of the density of the silver or other photographic deposit at that square unit, and which density may have as many as 10 to fifty values measurable by common densitometer procedures.

In FIG. 3, a modified arrangement is shown, there being unit squares 16 distributed across and along the film strip 18, and beside each crosswise strip a locating or fiducial spot 20 for a purpose to be described. Here again, the spacing of the squares a slight distance apart is purely for convenience of the showing in the drawings, since they may very well abut one another. Each of the unit squares 16 of FIG. 3 corresponds to one of the elemental square areas of photographic deposit which together make up the lines 14 in FIG. 2. However, in FIG. 3 the effective density of each of the unit squares 16 is obtained as the integrated or average density of the entire spot 16 resulting from the fact that each of these spots is made up of a number of subsidiary areas some of which have been made "black" and some of which have been left white or clear. For example, the unit squares 16 in FIG. 3 are shown as divided into nine subsidiary areas, certain of which have been rendered black or opaque, while the remainder have been left white or relatively clear.

The special advantage of the form of unit square formation shown in FIG. 3 is that such a record can readily be provided by printing or impressing coloring material in or on a strip, card or the like, as well as by photographic methods. For example, the different unit squares 16 of FIG. 3 may be obtained by using a typewriter whose type bars are shaped to blacken certain of the subsidiary portions of the unit squares, as shown, by reason of the type bars being shaped to produce this impression through the ordinary ribbon or inking process. Such a record is valuable for many applications, and it can be sensed photometrically in the same way as a record of the FIG. 2 type is interpreted.

The manner in which such records of stored information may be produced will be deferred for the moment, as the invention will better be apprehended by considering first the way in which records of such form can be read and interpreted. To this end, reference is now made to FIG. 4 of the drawings, which shows partly in perspective schematic and partly by means of labelled blocks, one preferred arrangement for converting the stored data to useful electrical output values. In that figure the record strip, bearing the recorded data as spots of varying densities, is again denominated 10, and is shown as carried between reels 22, 24 and as driven therebetween by a sprocket wheel 26. The strip is maintained taut by usual supply and take-up reel controls, common in the film handling art. A light source 28 is arranged to illuminate at least a limited portion of the strip across its width, and a projection lens 30 forms an image of the film, or at least a crosswise element thereof corresponding to one row of elemental spot areas. The image is shown as at a window plane 32, and is preferably an aerial image to avoid confusion with dust or the like which might fall upon a transparent or translucent plate. The image of a sprocket hole is designated 12', that of a locating spot is designated 20', and the image of the line of density areas at 14'. Reading along the line 14', from left to right, the first two elemental spot areas after the locating spot image are provided for a special purpose, and are designated 34', 36', to correspond to their real conjugates 34, 36 in FIG. 2. There are preferably two such "initial" spots at the end of each line, and they serve to define the range of recordable and recorded densities employed in making the original stored record strip. Thus, the first such spot 34 has the highest optical density which can be employed in the system under consideration, and spot 36 has the lowest density, namely that resulting from the fog level of the paper or film (absorption of light in the film base and unexposed but developed emulsion, for example, after complete processing).

The longitudinal feeding of strip 10 in FIG. 4 is accomplished by a motor 38 connected to drive the sprocket 26 through shafts 40, 42 and suitable gearing 44. While continuous feeding is possible (e.g., if the lines 14 are slanted across the strip so as to remain centered in a transverse scanning line, or by scanning along an inclined path), for the purpose of explanation the motor is considered as intermittently driven to advance the strip one line width (or line plus space) by means of the motor control indicated at block 46 in turn controlled by pulses from a photocell pick-up 48 focussed on the path of the line-locating spots such as 20 of FIG. 3; it is to be remembered that such spots may also be provided in the case of the FIG. 2 embodiment, and this modification of FIG. 2 is presumed in the illustration of FIG. 4. Thus, upon completion of one line scan, control 46 advances motor 38 to progress strip 10 to the next line, the advance being terminated when cell 48 senses the presence of locating spot 20 in proper position.

Energization of control 46 also passes a control pulse to a magnet 50 which attracts its armature 52 and thereby draws a stop 54 out of the path of a tooth 56 on a one-revolution disc 58 driven through a slipping clutch or drive from a constantly rotating motor 60. At the end of this control pulse, spring 62 urges stop 54 to the position shown, so as to stop disc 58 after a full turn. During this rotation, disc 58 rotates a shaft 64 carrying a cam 66 whose follower roller 68 is mounted upon an arm 70 which thereby rotates a mirror 72 about the fixed axis of an axle 74 of the arm 70. Cam 66 is so designed that mirror 72 executes, for each turn of the cam, a simple linear scanning motion covering one line of the imaged density spots, including the two "initial" spots 34' and 36'. Upon reaching the last spot in the row, the direction of mirror 72 rapidly reverses so that it comes back to the position shown, ready for the start of the next line.

The tilting mirror 72 directs light from successive parts of the line image of density spots to a photocell 76 through a field-defining aperture mask 77 and a constantly rotating chopper disc 78 (to facilitate transmission and amplification of the cell output) to produce an output from the cell varying with its transmission density or opacity. It may be stated that the system envisages the use of discrete values of density, rather than the continuous range of possible density variations, and that record strips as described carry only spots whose densities differ by appreciable amount corresponding to the steps of the discrete series employed. Such an arrangement permits accurate regeneration of the amplitude values as required, and removes any ambiguity as to amplitude which might otherwise arise, and thus preserves the digital character of the recorded data.

An exemplary arrangement for rendering the apparatus immune to changes in film color or darkening with age, and to changes in the intensity of light source 28, within reasonable limits, will now be described. Again referring to FIG. 4, shaft 64 is shown as extending beyond scanning cam 66 and carrying a wiper or switch arm 80. At the initial point of each scan line (when first initial spot 34 is being interpreted by the cell 76), this wiper rests on a blank contact or position, and when the mirror advances to inspect the second "initial" spot 36, it rests on a contact 82 which completes a circuit through a battery and the coil of relay 84 to close its contacts. Thereafter, as spots bearing recorded data are inspected, the wiper passes to a contact arc 85 and completes a circuit to operate relay 86. A relay 88 is paralleled with relay 84 and also operates when contact 82 is engaged by the wiper.

The purpose of the above arrangement is to permit the apparatus to make an internal correction for changes in the recorded density either with time or as a result of errors or accidents. Since the initial or control spots are provided preferably (though not necessarily) at the beginning of each line of spots, the self-correction action occurs periodically, and will correct even for differential changes in the density scale as between successive lines or groups of lines, and for similar short-period changes in the light source 28 or optical system adjustments.

The manner in which self-correction is achieved will be understood now by referring to FIG. 5 of the drawings, in which relays 88 and 86 are indicated by the same numbers, as is cell 76. A twin-tube differential D.C. amplifier is indicated at 90, the same being of a well-known type used in computer applications, so arranged that each triode section acts as a cathode follower driving the cathode of the other. The output of such an amplifier, derived between the plate lead 92 and "ground" (a common lead of the input and output circuits) is proportional to the differences of the input voltages applied to the respective control grids of the triode sections, i.e., at leads 94 and 96. Since the output of cell 76 is alternating current or voltage, rectifiers 98 and 100 are provided for these leads.

The action is as follows: with wiper 80 (FIG. 4) in the position shown, none of the relays is energized, and the output of cell 76 passes over the back contact (the normally closed contact) of relay 88 to the input lead 94, and also to the upper plate of condenser 102 which is thereby charged to a level depending upon the density of the first control spot 34 of the film line being scanned.

The condenser has its lower plate, of course, connected to ground, and the output of cell 76 is to be understood as between the indicated cell conductor and the same ground conductor. The charge on condenser 102, and hence the voltage of its upper plate is maintained for a sufficient period to permit the comparison action to be described, but ultimately the charge leaks off over a resistance in shunt to the condenser. During this period, amplifier 90 is deenergized because its plate supply lead 104 is interrupted at the normally open contacts of relay 84. When, however, the second initial spot (or rather its serial image 36′) is reached, wiper 80 will contact point 82, and relays 84 and 88 will operate. Relay 84 will close its contacts to supply plate voltage to the differential amplifier 90, and relay 88 will open the conductor from cell 76 to amplifier input conductor 94, and connect the cell to input conductor 96. Since input conductor 94, due to condenser 102 acting as a storage device, will remain at its set potential, the amplifier output at lead 92 will now be proportional to the difference in the densities of the first two spots, the control spots 34 and 36. This control, in the form of a voltage magnitude, is amplified as at amplifier 106, whose last stage 108 (or a succeeding stage) puts upon condenser 110 a charge proportional to the density range measured and defined by the control spots. The output of stage 108 is connected to an automatic gain control circuit 112 of known form, to set the gain of an amplifier 114. The gain setting is maintained by condenser 110 for the period of one line scan (more if density range corrections are made less often), and is reset upon arrival of new density range information. If desired, the gain setting circuit may be reset positively by a voltage pulse from a delay circuit 117 triggered from the shaft 64 or wiper 80.

The main read-out amplifier having been in this way adjusted to provide the proper density values for each successive spot in the scansion, the wiper 80 proceeds to engage contact arc 85 for the remainder of the line scan, and causes operation of relay 86 which connects cell 76 to the amplifier 114 for reading out the stored information in the remainder of the line.

In order to restore precisely the discrete digital values corresponding to the recorded information, the output of amplifier 114 is applied to the digitalizing or quantizing circuit comprising a series of gas triodes 116 having their control or igniting electrodes connected to respective points of a voltage dividing resistor string 118 and their anodes to the divider string 120. In a known way, the potential applied to the control electrode string (from amplifier 114) causes the firing of a number of the tubes corresponding to that potential. Thus, for any potential applied to the quantizing circuit, a specific output voltage will be applied to the output device 122, the stepped nature of the voltages being indicated at 124. In this way, minor differences in tubes or resistors or other components in the entire apparatus are resolved and the output information corresponds exactly to a specified series of discrete values corresponding in turn to the values of the recorded densities or original data parameters.

Output device 122 may be a mechanical printer, an indicator, register, electric typewriter or other device. In FIG. 6 there is indicated a specific read-out device consisting of a mirror galvanometer 124 deflected by the output of the quantizing circuit, so that the output magnitude is indicated on screen 126 as the deflection of a spot of light reflected by the mirror from light source 128. In FIG. 7, an optical digit printer is shown as driven by the output of FIG. 5, the flashing light 130 being flashed by the control 132 synchronized to the reading of each scanned spot by a control unit 134 which also controls rotation of a character disc 136 so as to flash the lamp at a time determined by the read-out magnitude and thereby to print a value upon film 138, in a manner generally known in the projection printing art.

With the above discussion in mind, certain preferred ways of preparing the record itself will now be disclosed, in connection with FIGS. 8 to 10 of the drawings. This part of the process could of course be carried out in other ways, so long as specific values of density are laid out in serial order upon suitable carrier or record material. In FIG. 8, record strip material 140, in the form of unexposed photographic film, is carried over a roller 142 similar to a typewriter roller, with a motor drive 144 to advance the roller from line to line. The density values are recorded by a printing light source 146 and suitable optics such as a reflector 148 and lens 150 carried upon a sliding carriage 152 arranged to step the desired distance (from spot position to spot position) as by an escapement 154 synchronized with the operation of recording keys 156.

Keys 156 are arranged so that as any key is depressed the escapement is operated to advance the carriage 152 one step. Also, for each stepwise advance, the escapement linkage 158 operates a switch 160 to flash the lamp 146 to record a selected value of density upon the film 140. Each separate key is pivoted as shown, and each has at its end an adjustable stop (which may be a screw projecting from the key lever) arranged to engage and lift a wedge carrier 164 to a position such that a different portion of the optical graywedge is between lamp 146 and the film. Thus, the density recorded when a key is depressed is related specifically to that key.

For providing the control densities 34 and 36 of FIG. 2, it is sufficient if the operator depresses in order the two keys corresponding to the maximum and minimum (or vice versa) values of density used in the system. These keys can of course also be used for recording significant data. The control spot 20 (FIG. 3) can be recorded in like manner.

FIG. 9 shows an arrangement for the automatic recording of the maximum and minimum density or control spots. In this modification, the carriage is arranged to be returned leftward automatically as by friction drive rolls 166 driven by a motor (not shown), its leftward position being established by a spring 168. At the extreme of its leftward motion, when the projection optics are positioned over the region to be occupied by the first control spot 34, spring 168 is compressed, and a switch 170 is operated to energize a relay 172 closing a circuit to move a fixed (maximum) density filter 174 into the optical path. Switch 170 also energizes lamp 176 to record this minimum density (of transmitted light) at the first control spot position. When the carriage is returned slightly to the right (as spring 168 expands when drive rolls 166 are deenergized), the relay 172 releases and the filter 174 moves out of the optical path. During this return motion, a dog 178 pivoted on the carriage operates a second switch 180 to flash lamp 176 again, to record the maximum possible density upon the second control spot area. The data to be recorded are then set up by separate keys as in the case of FIG. 8. A stop pin on one side of dog 178 causes operation of switch 180 only when the carriage moves to the right, the dog pivoting idly during leftward motion.

The reading out of data as described above has been a progessive operation, whereby the contents of the record is read out in a continuous series, according to the order in which the data were recorded. In most cases, a selection system will be utilized in order to permit specified or particular information only to be withdrawn from the record. Thus, the first few spots of each line may define a number representing a particular account, and the successive spots of that line may record credit and debit information or the like pertinent to said account. On the other hand, several lines of spots may be used to record a large number of items particular to one account. Means for selecting the desired portion of the record, and then reading out the stored data, may be provided as desired.

In cases in which the initial spots of a line define a particular account or subject, selection of the desired record film area or region may be accomplished on a non-digital basis, followed by digital readout of the pertinent data when the proper region has been located. The present system which records multiple density steps at each location lends itself well to such non-digital scansion, and a simple system employing this feature is shown in FIG. 10 of the drawings. Briefly, the procedure is to scan only the first portion of each line (or each second, third and so on line in the case of multiple-line entries for each subject). This scansion is to be done by a small-amplitude oscillation of the scanning head, to produce a complex electrical wave whose Fourier analysis will be characteristic of the particular succession of digital amplitude values. Thus, the series of five densities identified as density steps 3, 12, 42, 19, 2, when scanned in succession, will produce a particular wave shape whose harmonic content is fairly well representative of that series of digital values. When applied to a suitable selective circuit (which may be adjustable to call for the desired subject only), the circuit output may be made to operate a signal indicating that detailed scansion should be performed to verify the correctness of the identification, or to establish connections so that detailed readout of the recorded information will automatically ensue.

Referring now to FIG. 10, such an arrangement is illustrated in detail. The record strip is again designated by numeral 10 and is wound from any supply station over a drive roll 182 as by a motor 184 and electric clutch 185 which will usually be controlled to advance the strip one row at a time. A suitable take-up roller to maintain the record taut when moving in the direction of the arrow is indicated at 186 and will normally be over-driven in a known manner for this purpose. Scanning of the initial spots in any given row is accomplished by an optical system mounted upon a rotatable support 188 and comprising a focusing lens and a read-out photocell 190. The support is oscillated about its pivot 192 as by a crank and lever system 194 which may be powered from the motor 184; for example, during each period when clutch 185 is de-energized and drive roll 182 is stationary. A switch 196 energized at the end of the scanning oscillation is provided to energize the motor control circuitry 198 to initiate a subsequent feeding motion of the roller 182. During the scanning, the output of photocell 190 will be amplified and digitalized in the circuitry designated 200 (which may be of the form indicated in FIG. 5) and the output applied to the waveform analyzer 202.

If the analysis thus accomplished corresponds to the information sought (that is, if the first few index spots of the row on tape 10 indicate that it is the line desired), a control signal will pass from analyzer 202 to motor control 198 to interrupt the successive actuations of clutch 185 and give an appropriate signal to the operator so that the remainder of the row can be inspected or analyzed by any appropriate means, or copied for use. However, FIG. 10 illustrates a preferred arrangement in which, when the above described operations have identified the proper row on tape 10, a signal is supplied from motor control 198 to prepare the automatic read-out equipment 204 so that, when the row so identified has reached a region indicated by chain lines at 206 constituting a complete read-out station, the entire row will be analyzed and the stored information made available in any of the ways already referred to.

The equipment just described permits a row containing a good deal of information on one subject to be found with great speed in an automatic manner, by limited scanning or reading of an index portion of the row comprising perhaps five or fewer multi-valued record spots. It also provides for the automatic reading-out of an entire row when it has been determined said row has been properly identified by the small number of index spots.

It will be understood that while reading or interpretation of the records has been described as essentially the scanning of successive lines, or parts of lines, it is also quite feasible to provide a separate photoelectric cell for each of the columns on the tape, or for certain of the columns, in which case all parts of a row may be constantly illuminated and the information recorded in individual areas read simultaneously. Additionally, with this arrangement, the individual readings could also be obtained in sequence by suitable switching arrangements, obvious to those skilled in electronics, by means of which the output from each of these individual cells would be directed in turn to a single interpreting circuit. In any case, means such as described in connection with FIG. 4 for making the correction for changes in fog level or density are to be provided, the same being indicated in FIG. 10 by the photoelectric system 208. It will be understood that the showing of this portion in FIG. 10 is merely indicative of the presence of such means, and that the details thereof will include the densitometric features such as illustrated in connection with FIG. 4 or equivalent means.

From what has been said, it will be clear that the recording of optical density values differing one from another by multiple values, or selected from a plural set of such values, is of the essence of the present invention, whose special features are all directed to this difference over prior systems in which the range of possible values encompasses only two values. Moreover, the essentially digital (but not merely binary) character of the system is ensured by specifying the use of only a limited number of values of density, rather than the analog representation corresponding to a truly continuous range of densities as in known photographic sound records. Therefore, as used in the claims, such terms as multi-valued, several, plural set, and the like, are intended to define selected values from a set comprising more than two, but not an infinite number, of members.

The application of the invention to discrete record carriers, such as statistical cards, accounting sheets and the like, will be obvious to those skilled in the art, the system in no sense being limited to utilizing a record in the form of a continuous strip. Rough indexing preliminary to the final search for certain or all of the densitometrically recorded data may also be accomplished by known methods of indexing, for example, by markings in clear text upon the strips or cards. Furthermore, the output information derived by the densitometric operations may equally well be applied to the production of further records, either densitometric or of the Hollerith type, or the information signals may be directly conveyed to computing machinery or circuits without any intermediate reduction of the data to clear text. Such modifications and changes, and others, will occur to those skilled in the handling of data by mechanical methods, and are not to be excluded from the scope of the present invention which is defined by the appended claims.

What is claimed is:

1. Data handling system comprising means for recording optical density values, selected from a multiple range of densities, on spaced discrete elemental areas of uniform size on a record material, means for individually controlling the density value of each such recorded area in accordance with individual values within the range of information to be recorded, optical means for scanning such areas after the recordation of such information, and means responsive to the output of said optical means for indicating th particular single value of information recorded on each area.

2. Data handling system comprising means for recording multi-valued optical densities on spaced discrete elemental areas of uniform size on a record material, means for individually controlling the density value of each such recorded area in accordance with any of several individual values of information to be recorded, optical means for scanning such areas after the recordation of such information, interpreting means responsive to the output of said optical means for indicating the value of information recorded on each area, and means responsive to the total range of recorded density for adjusting the response of said interpreting means.

3. Data handling system comprising means for exposing to light discrete uniform-size elemental areas of a photo-sensitive material, means for individually controlling the quantum of each such exposure in accordance with individual values, selected from a range of values, corresponding to information to be recorded, optical means for scanning such areas after the recordation of such information, and means responsive to the output of said optical means for indicating the particular single value of information recorded on each area.

4. Data handling system comprising means for exposing to light discrete uniform-size elemental areas of a photo sensitive material, means for individually controlling the quantum of each such exposure in accordance with multiple individual values of information to be recorded, optical means for scanning such areas after the recordation of such information, interpreting means responsive to the output of said optical means for indicating the single value of information recorded, from amongst said multiple values, on each area, and means responsive to the total range of recorded exposure for adjusting the response of said interpreting means.

5. Data handling system comprising means for recording optical density values on discrete uniform-size elemental areas of a record material, said density values being selected from a predetermined multiple series of discrete and separated density values constituting a density alphabet, the selected values being related to items of data being recorded, means for measuring the recorded densities of said areas, and means for adjusting the signal output of said measuring means to achieve correspondence between the output signal variations and the density values of said predetermined series.

6. Data interpreting apparatus for use with density-step records of the type in which individual data items are recorded in terms of discrete density values of spaced uniform-size areas of the record, corresponding to selected ones of a predetermined multiple series of density values, comprising: means for sequentially measuring the individual recorded densities at spaced areas of the record, and automatic means for adjusting the output of said measuring means to achieve correspondence between its output signals and the corresponding steps of the predetermined series.

7. A data read-out device for reading data stored as elemental areas of multiply differing optical densities in a strip-like record, comprising means for intermittently advancing said record, means for producing an optical representation of a selected group of said elemental areas at each intermittent position of said record, means for optically scanning said representation, and means controlled by said scanning means for producing electrical outputs selectively representative of the individual optical densities of the elemental areas of said selected group.

8. The invention in accordance with claim 7, including means responsive to the movement of said record by said advancing means for initiating operation of said scanning means.

9. The method of manipulating data comprising recording different data items in spaced positions upon a record sheet, each item being defined by a unique value, from a plural set of values, of the optical density of the record at the corresponding position, periodically recording upon the same medium predetermined density control areas corresponding to the total available range of magnitude representation, thereafter scanning said medium to produce a succession of indications of the individual densities at record positions corresponding to items of information, and adjusting said indications to correspond to the respective unique values employed during the original recording.

10. The method of manipulating data comprising recording different data items in spaced positions upon a record sheet, each item being defined by a specified value, form a plural set of values, of the optical density of the record at the corresponding position, thereafter measuring the recorded densities of selected portions of the sheet, and generating from each measurement an output signal selected from a series of such signals corresponding to the entire set of original specified values of densities.

References Cited in the file of this patent

UNITED STATES PATENTS

| | | |
|---|---|---|
| 2,196,166 | Bryce | Apr. 2, 1940 |
| 2,199,559 | Dawson | May 7, 1940 |
| 2,238,947 | Ross | Apr. 22, 1941 |
| 2,270,260 | Burrill | Jan. 20, 1942 |
| 2,460,060 | Butler | Jan. 25, 1949 |
| 2,497,042 | Doll | Feb. 7, 1950 |
| 2,582,004 | Capstaff | Jan. 8, 1952 |
| 2,596,741 | Tyler | May 13, 1952 |
| 2,621,560 | Steinhardt | Dec. 16, 1952 |
| 2,726,131 | Shelton | Dec. 6, 1955 |